J. G. CAPSTAFF.
MAKING MULTIPLE PHOTOGRAPHIC EXPOSURES.
APPLICATION FILED SEPT. 1, 1915.
1,260,324.
Patented Mar. 26, 1918.
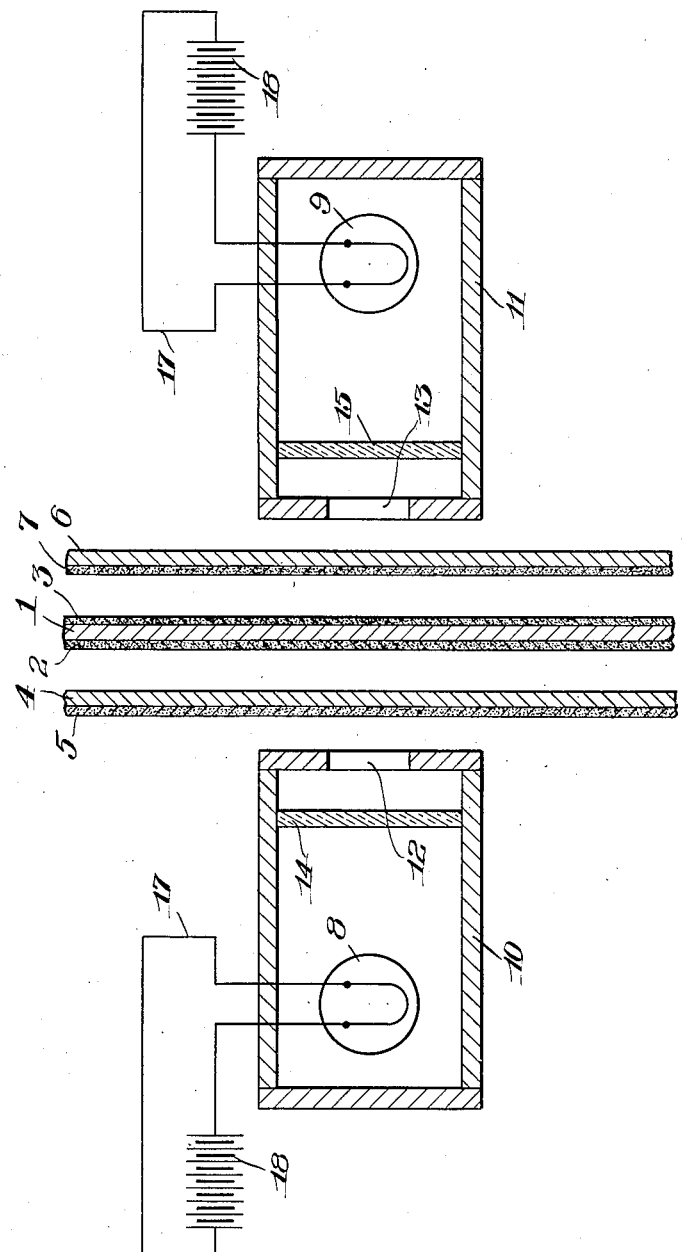
WITNESSES:
INVENTOR
John G. Capstaff
BY
his ATTORNEYS

UNITED STATES PATENT OFFICE.

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK.

MAKING MULTIPLE PHOTOGRAPHIC EXPOSURES.

1,260,324.

Specification of Letters Patent.

Patented Mar. 26, 1918.

Application filed September 1, 1915. Serial No. 48,428.

*To all whom it may concern:*

Be it known that I, JOHN G. CAPSTAFF, of Rochester, in the county of Monroe and State of New York, have invented certain new and useful Improvements in Making Multiple Photographic Exposures; and I do hereby declare the following to be a full, clear, and exact description of the same, reference being had to the accompanying drawings, forming a part of this specification, and to the reference-numerals marked thereon.

My present invention relates to photography and more particularly to methods of exposing photographic sensitized material and it has for its object to provide a method whereby two substantially translucent photographically sensitive bodies may be placed in superposition and one of them exposed without the light affecting the other to an appreciable degree or to such degree as would interfere with a previous or a subsequent photographic record made thereon, this result being accomplished without the use of an intermediate screening element to protect the body not intended to be acted upon. I contemplate the use of my invention in connection with the preparation of cinematograph or motion picture film for projecting pictures in color where it is required that a plurality of superposed or registered image records, differently colored, be simultaneously projected by transmitted rays for the production of a picture in the composite colors of nature. To these and other ends the invention resides in certain improvements and combinations of parts all as will be hereinafter more fully described, the novel features being pointed out in the claims at the end of the specification.

In the drawing:

The figure is a sectional view showing one form of apparatus that may be used in the practice of my invention.
I will first describe my invention in its specific application to the manufacture of motion picture film for the projection of pictures in color.

As above indicated, each picture unit is a composite formed of a plurality of photographically recorded images of the same subject taken at or about the same time and arranged in exact register upon a transparent film base or support. The records are preferably taken from the same point of view or through a single lens, the components thereof being devoted to substantially complementary color values by being dyed, for example, red and blue-green. After the duplicate records are made and assembled, the particular method employed for coloring or dyeing them is not important to an understanding of the present invention, different methods being possible so far as the present invention is concerned.

Two negative films or record strips are prepared to record the necessary color separation, in any suitable way. For instance, two separate films may be used or one double width film, or the two records may be constituted by alternate pictures on a single width film or even opposite sides of a single width film may be utilized. These records being negatives must be made positive for projection purposes and this may be done by printing upon positive film. It is here that the superposing or registering of the two components that are respectively to contribute the different color values to the picture may be effected by using a double-coated positive film and printing or light recording one record on one side thereof and the other record on the other side. By "double-coated" film I mean a film composed of a suitable transparent base or support with a coating or layer of photographically light sensitive material on each side. Thus, when the registering images on each side are developed and given their respective colors and projected by light transmitted through both of them and through the intermediate support, a picture in the combined colors results.

But in view of the fact that this intermediate film base or support has to be transparent, difficulty has been experienced in printing or otherwise exposing the sensitive body on one side of the support without affecting the body on the other side. If it is attempted to temporarily dye the film base or otherwise develop opacity intermediate the two coatings, this agent must be removed at some later time before the film is ready to be projected and because it is so confined, this eradication is difficult to achieve.

My present invention solves the difficulty by so selecting the light rays by means of which the printing or exposing is done with relation to the light absorbing properties of the sensitive material that these rays are strongly absorbed by the first sensitive body that they reach and do not penetrate appreciably to the farther body on the other side of the transparent support, to materially affect the sensitive material thereon.

Photographic emulsion as used on ordinary cinematographic film is somewhat yellow in color, is sensitive mainly to ultra violet, violet, blue and green light, or in other words, to light materially absorbed thereby, which comprises the shorter wave lengths. On the other hand, the opacity of the emulsion to light increases with the decrease in the wave length of the light, so that light of a short wave length penetrates the emulsion to a less depth than light of a longer one. Accordingly, ultra violet and violet lights do not pass through the sensitized layer on the ordinary positive film as readily as blue and green lights. Then, since the emulsion is sensitive only to green, blue, violet and ultra violet, I eliminate the blue and green from the source of light and use only the extreme violet and the ultra violet rays.

If it is found desirable to use an emulsion of a different color, or to color the ordinary sensitized emulsion or its support or to use a colored medium therewith, a different portion of the spectrum will be absorbed and a different colored light may have to be employed. Hence, I overcome the difficulties noted above by printing with light of a suitable intensity of which the greater part belongs to that portion of the spectrum which is of such wave length as to affect the emulsion but which is absorbed thereby, passing through only to a small extent, e. g., light of the shorter wave lengths, such as violet and preferably ultra violet, in the case of ordinary positive emulsion. Whatever the color sensitiveness of the emulsion may be, such a light must be employed as will be most strongly absorbed thereby.

It is clear that many kinds of light may be used for printing the double coated positive film, bearing an emulsion of the usual color, so long as the major portion of the light comprises the shorter wave lengths when it reaches the emulsion. I may use, therefore, a light which initially gives off mainly the violet and ultra violet rays, such as a mercury vapor lamp, or I may use any light from which the rays of the longer wave lengths are eliminated before the light reaches the more distant positive emulsion, as for example by passing the light from a tungsten incandescent lamp through a suitable ray filter which absorbs the larger portion of the red, yellow, green and blue or the longer wave lengths and passes the shorter wave lengths—violet and ultra violet.

I may employ, by way of further illustration, the light from a carbon arc used in such a way that the light is derived mainly from the flame thereof, and not from the electrodes. I prefer, however, to use either the mercury vapor lamp, in which the spectrum lines in the green and yellow are weak and have no material influence on the non-color sensitive positive emulsion, or to use an ordinary source of light such as the incandescent lamp and a suitable ray filter which cuts off substantially all but the extreme violet and ultra violet waves.

In order that the practice of my invention may be further understood, reference may be had to the accompanying drawing which shows diagrammatically an apparatus or means for carrying out my method of printing within the scope of the present invention.

The figure shows diagrammatically a vertical section of the essential portions of a printing apparatus embodying one phase of my invention where it is desirable to print double coated film from both sides simultaneously by violet light. The parts are distorted in size for the sake of clearness of illustration.

In the drawing, a positive film 1 provided with sensitized coatings 2, 3 on both sides is placed between and substantially in contact with negative films 4, 6 having their photographically coated faces 5, 7, bearing the picture records which are to be printed on the positive film. If cinematographic film is to be printed, suitable means for moving the films in unison will, of course, be provided.

Suitable light sources 8, 9, such as incandescent tungsten lamps, are inclosed in light tight compartments 10, 11 having windows 12, 13 therein adjacent the negative films. Where the light sources give out more than the ultra violet and violet wave lengths, as in the case with tungsten lamps, ray filters 14, 15 are used to cut off substantially all but the violet and ultra violet wave lengths. Each electric lamp is connected through suitable connections, such as a socket and wiring 17 with a battery 18, or other source of electrical supply.

It is, of course, clear that the film may be printed on but one side at a time, or that the image may be projected by a system of lenses onto the positive film in any well known or suitable manner, so far as the essential features of my invention are concerned. Furthermore, the usual precautions against fogging the film or exposing the sensitive surface to injurious light are to be taken.

Various types of photographic elements, other than cinematographic film, such as a single picture or a transparency to be viewed by artificial or natural light, or a lantern slide for a stereopticon, may involve a double coated substantially transparent support made up of any suitable light conducting material, such as the various types of film base, as for example, nitrocellulose or cellulose acetate film, or paper, glass, etc., hence where the term "film" is used in the specification or claims, it is to be understood as covering such other equivalent supports as may be used for photographically light sensitized materials, whether for cine projection or for single pictures. Similarly, the terms "negative" and "positive" are employed without reference to the character, size, shape, etc., of the photographic material used. It furthermore is obvious that the usual photographic operations, such as developing, fixing, washing, etc., will be carried out where necessary and that the various essential precautions will be observed throughout the procedure involved.

While I have given the manufacture of positive two-color cinematograph film having photographic bodies on opposite sides of a transparent support, as a specific instance of the practical application of my invention in the arts, it will be understood that the invention is not necessarily limited to such use, the idea being, broadly, to expose, exclusively, one of two closely associated light sensitive bodies in the presence of the other without the interposition of a screen. I may also state, with reference to the figure, that I am aware of a method of preparing color pictures wherein the film 1, 2, 3 is a negative film instead of a positive, the other films that are printed from being themselves positives, previously prepared, but the adoption of such a method does not alter the application of this invention and, in fact, no attempt has been made to illustrate or describe all the possible instances of its use.

I claim as my invention:

1. The method of making composite photographs by light recording a photographic image upon one of two superimposed bodies of like sensitiveness, both of which are accessible for individual exposure without light affecting deleteriously the other body, which comprises passing light of the proper intensity and of such wave lengths, with reference to the light absorption properties of such first mentioned body, from the image that the light will affect photographically the first of the superimposed bodies and be absorbed in it, no material amount passing through to the second one and light recording an image upon the latter, also.

2. The method of light recording a photographic image upon each side of a film comprising a substantially transparent base or support coated with emulsion of like sensitiveness on each side, without deleterious effects upon the coating on the other side, which comprises passing a light of the proper intensity and of such wave lengths, with reference to the light absorption properties of the coating, from the image to one sensitized emulsion that the light will not penetrate to the emulsion on the opposite side of the film to a material or injurious extent.

3. The method of preparing a photographic image on a translucent film coated on both sides with a medium which is sensitive to and absorbs violet and ultra violet light, which consists in passing violet and ultra violet light of suitable intensity from the image to be recorded to each of the sensitive mediums and thus using the absorbing powers of the latter with respect to such light to protect the other medium.

JOHN G. CAPSTAFF.

Witnesses:
ALICE K. WHITNEY,
CLAYTON L. JENKS.